(12) United States Patent
Hibben et al.

(10) Patent No.: US 10,066,116 B2
(45) Date of Patent: Sep. 4, 2018

(54) LATEX POLYMER FOR IMPROVED PAINT WASHABILITY

(71) Applicant: SWIMC LLC, Cleveland, OH (US)

(72) Inventors: Mary Jane Hibben, Elburn, IL (US); Michael Wildman, Hoffman Estates, IL (US); T. Howard Killilea, North Oaks, MN (US); William Heiden, Huntley, IL (US); Bruce Johnson, Crystal Lake, IL (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 14/478,230

(22) Filed: Sep. 5, 2014

(65) Prior Publication Data

US 2014/0378600 A1   Dec. 25, 2014

Related U.S. Application Data

(63) Continuation of application No. PCT/US2013/028863, filed on Mar. 4, 2013.

(60) Provisional application No. 61/607,087, filed on Mar. 6, 2012.

(51) Int. Cl.
    *C09D 133/02* (2006.01)
    *C09D 131/04* (2006.01)
    *C09D 133/06* (2006.01)
    *C09D 135/06* (2006.01)
    *C09D 133/08* (2006.01)
    *C08F 265/06* (2006.01)
    *C09D 151/00* (2006.01)

(52) U.S. Cl.
    CPC .......... *C09D 133/02* (2013.01); *C08F 265/06* (2013.01); *C09D 131/04* (2013.01); *C09D 133/06* (2013.01); *C09D 133/08* (2013.01); *C09D 135/06* (2013.01); *C09D 151/003* (2013.01); *C08L 2205/025* (2013.01)

(58) Field of Classification Search
    CPC .................................................. C09D 133/02
    See application file for complete search history.

(56) References Cited

U.S. PATENT DOCUMENTS

| | | | |
|---|---|---|---|
| 3,919,145 A | 11/1975 | Eckhoff | |
| 4,374,670 A * | 2/1983 | Slocombe | C09D 11/101 522/116 |
| 5,534,310 A | 7/1996 | Rokowski et al. | |
| 5,721,309 A | 2/1998 | Sharma et al. | |
| 5,852,095 A | 12/1998 | Yamauchi et al. | |
| 6,319,977 B1 | 11/2001 | Tysak | |
| 8,158,713 B2 | 4/2012 | Finegan et al. | |
| 2008/0161480 A1* | 7/2008 | Perumal | C08F 255/00 524/539 |
| 2009/0035587 A1* | 2/2009 | Killilea | C08F 220/18 428/447 |
| 2009/0264579 A1* | 10/2009 | Kitawaki | C09D 5/028 524/502 |
| 2011/0237736 A1 | 9/2011 | Roller et al. | |

FOREIGN PATENT DOCUMENTS

| EP | 1529815 | 5/2005 |
|---|---|---|
| JP | 2004352944 | 12/2004 |

OTHER PUBLICATIONS

Supplementary European Search Report for EP Application No. 13758004, dated Sep. 30, 2015. 5 pages.
International Preliminary Report on Patentability for related case PCT/US2013/028863 dated Sep. 9, 2014. (7 pages.).
International Search Report and Written Opinion for related case PCT/US2013/028863 dated Jun. 27, 2013. (9 pages.).

* cited by examiner

*Primary Examiner* — Arrie L Reuther
(74) *Attorney, Agent, or Firm* — Patterson Thuente Pedersen, P.A.

(57) ABSTRACT

The present invention is directed to a coating composition or paint comprising a polymer system including one or more latex polymers, wherein the acid content and molecular weight of the latex polymers are balanced to provide a coating composition that demonstrates optimal performance characteristics of washability or stain resistance, especially when used in a flat finish paint.

19 Claims, No Drawings

LATEX POLYMER FOR IMPROVED PAINT WASHABILITY

CROSS REFERENCE TO RELATED APPLICATION

This application is a continuation of International Application Serial No. PCT/US13/028863, filed on Mar. 4, 2013 and entitled "Latex Polymer for Improved Paint Washability", which claims the benefit of U.S. Provisional Application Ser. No. 61/607,087 filed Mar. 6, 2012 and entitled "Latex Polymer for Improved Paint Washability". Each of the aforementioned applications are incorporated herein by reference in its entirety.

BACKGROUND

For environmental and regulatory reasons, latex compositions, because of their lower toxicity and lower volatile organic compound (VOC) content, are now preferred for painting architectural surfaces, and especially interior surfaces. However, latex paint compositions, especially flat paint compositions, have poor stain resistance and are not typically washable, and therefore, use of such paints is generally limited to ceilings or low traffic areas of a building or home.

From the foregoing, it will be appreciated that there is a need for latex compositions for use in paint compositions, including flat finish compositions that demonstrate excellent performance characteristics, including washability or stain resistance.

SUMMARY

The present invention provides coating compositions that include latex polymers for use in low VOC paint, including flat finish paint, for example. Surprisingly, and in contravention of industry bias, paints that include the polymer compositions described herein are capable of being washed or cleaned without significant film or paint loss.

Accordingly, in one embodiment, the present invention provides paint or coating compositions that include a polymer system with at least 10% to 30% of the system having a molecular weight of about 10,000 to 40,000 and acid percent of about 5 to 10. Such a coating composition, when used in a flat finish paint, for example, has washability rating of at least 7. In another embodiment, the present invention provides a method of making a paint or coating composition by providing one or more latex polymers, and adjusting the acid content and molecular weight of the latex polymers to obtain a polymer system with at least 10% to 30% of the system having a molecular weight of about 10,000 to 40,000 and acid percent of about 5 to 10. Coating compositions, especially flat finish paints, for example, made by this method have washability rating of at least 7.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

Selected Definitions

Unless otherwise specified, the following terms as used herein have the meanings provided below.

The term "component" refers to any compound that includes a particular feature or structure. Examples of components include compounds, monomers, oligomers, polymers, and organic groups contained there.

The term "double bond" is non-limiting and refers to any type of double bond between any suitable atoms (e.g., C, O, N, etc.). The term "ethylenically unsaturated" refers to compounds that include a carbon-carbon double bond (i.e., —C=C—).

As used herein, the term "washability" refers to the relative ease of removing dirt, soil, discolorations, and the like, from the a dried film of a coating applied to a substrate surface, typically an interior architectural surface such as a wall, for example. The soil or dirt is typically removed by washing with abrasive and/or non-abrasive cleaning compositions. To measure washability, a standard test method, ASTM D3450-00 (Standard Test Method for Washability Properties of Interior Architectural Coatings) is used. The terms "washability" and "stain resistance" are used interchangeably herein.

Unless otherwise indicated, a reference to a "(meth) acrylate" compound (where "meth" is bracketed) is meant to include both acrylate and methacrylate compounds.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a", "an", "the", "at least one" and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

Embodiments of the invention described herein feature coating compositions that include a polymer system, used as the binder component or as a blending ingredient in a paint, for example, with at least 10% to 30% of the system having a molecular weight of about 10,000 to 40,000 and acid percent of about 5 to 10. Such a coating composition, when used in a flat finish paint, has washability rating of at least 7. The composition as described herein is preferably substantially free of volatile organic compounds (VOC), and is used to make paints, including flat finish paints, for example, for interior architectural surfaces. Preferred paints demonstrate excellent performance characteristics, such as superior stain resistance or washability, for example.

In an embodiment, the polymer system described herein is suitable for use in a low-VOC or zero-VOC paint to be used as an interior architectural coating or wall paint, for example, especially a paint with a flat finish.

The term "finish," as used herein, refers to the texture or appearance of a paint when applied and dried on to a substrate, typically an architectural surface such as an interior wall, for example. The term may also be used to refer to the paint used to produce said texture or appearance when applied to an architectural surface such as an interior wall. Paints are typically found in a variety of finishes such as, for example, flat or matte, eggshell, satin, semigloss and glossy finishes.

The finish of a particular paint is a function of the pigment-to-binder (P-to-B) ratio of the paint or composition, where the higher the P-to-B ratio, the less reflective the paint. For example, a flat paint has a high P-to-B ratio and dries to a non-reflective or minimally reflective appearance when applied to an architectural surface. The P-to-B ratio is sometimes expressed as a pigment volume concentration (PVC), i.e., the volume fraction of pigment in the total volume of dried solid paint. Architectural paints, including flat paints, for example, can be made with a wide range of PVC. For example, the paint described herein preferably has PVC of about 25 to 60, more preferably 30 to 55. Because of the relatively high amount of pigment, i.e., PVC of about 40 to 55, a flat paint has good hiding potential, i.e., it can cover or hide most surface imperfections. However, flat paint tends to attract dirt, soil, and other stain-forming materials. Without being bound to theory, it is believed that flat paint is more porous and, therefore, particulate matter, including dirt, soil particles, and other residues are easily trapped within the paint surface.

Architectural surfaces coated with flat finish latex coating compositions or paints are difficult to clean, as dirt and soil particles become trapped within the pores of the dried paint. Typically, using an alkali soluble support resin to make the coating composition provides slight improvement in stain resistance or washability properties. However, these paints have poor scrub resistance and in fact, stains are removed only as a result of the removal of one or more layers of the paint itself. Surprisingly, and in contravention of industry bias, the coating composition described herein, when used in a paint composition, and especially a flat finish paint, for example, demonstrates exceptional stain resistance or washability.

In an embodiment, the coating composition or paint described herein includes a polymer system made by controlling the molecular weight and acid content of one or more polymers. The term "polymer system," as used herein refers to a mixture, blend or other combination of one or more latex polymers. The latex polymers included in the polymer system may be homopolymers, heteropolymers or copolymers, blends of one or more monomers, one-component, two-component or multi-component blends of polymers, multistage latex polymers, combinations thereof and the like.

The polymer systems described herein preferably include one or more water-dispersible polymers, or one or more latex polymers. Such polymers are well-known in the coating industry and include a wide variety of polymers.

In certain embodiments, suitable polymers include polyurethanes, epoxies, polyamides, chlorinated polyolefins, acrylics, oil-modified polymers, polyesters, and mixtures or copolymers thereof, for example. Such polymers are readily synthesized using conventional techniques known to those of skill in the art.

Preferably, the one or more water-dispersible or latex polymers include one or more polymerization product(s) of (i) ethylenically unsaturated monomers, such as, for example, alkyl and alkoxy (meth)acrylates, vinyl esters of saturated carboxylic acids, monoolefins, conjugated dienes, polyfunctional acrylates, and the like, optionally with (ii) one or more monomers, such as, for example, styrene, methyl methacrylate, butyl acrylate, 2-ethylhexyl acrylate, vinyl acetate, acrylonitrile, vinyl chloride, and the like.

Suitable ethylenically unsaturated monomers include, for example, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide, acrylamide, methacrylamide, methylol (meth)acrylamide, styrene, α-methyl styrene, vinyl toluene, vinyl acetate, vinyl propionate, allyl methacrylate, and mixtures thereof. Preferred monomers include styrene, methyl methacrylate, methacrylic acid, acetoacetoxy ethyl methacrylate, butyl acrylate, and the like.

Suitable polyfunctional acrylates include, for example, di-, tri- and tetra-functional acrylates such as dipropylene glycol diacrylate (DPGDA), propoxylated glyceryl triacrylate (GPTA), pentaerythritol tetraacrylate, dipentaerythritol tetraacrylate, mixtures thereof, and the like. Preferred polyfunctional acrylate monomers include pentaerythritol tetraacrylate, dipentaerythritol tetraacrylate, and the like.

The latex polymer may also be stabilized with an alkali-soluble polymer. Alkali-soluble polymers may be prepared by making a polymer with acrylic or methacrylic acid or other polymerizable acid monomer (usually greater than 10%) and solubilizing the polymer by addition of ammonia or other base. Examples of suitable alkali-soluble support polymers are JONCRYL 675 and JONCRYL 678, and the like.

The polymer system described herein may be a one-component system, a two-component system, or a multi-component system. In an embodiment, the polymer system described herein is a one-component system that includes one or more latex polymers, wherein the latex polymers may be homopolymers, copolymers or blends of one or more monomers, including ethylenically unsaturated monomers as described above.

Various methods can be used to prepare the polymer system described herein, including by conventional methods known to those of skill in the art. By controlling the type and amount of monomers selected, i.e. by controlling the acid content and molecular weight of the monomers selected, a polymer system suitable for low VOC coating compositions or paints may be formed, and the polymer system preferably provides excellent performance characteristics, such as, for example, scrub resistance and washability or stain resistance, especially when the system is used in a flat finish paint.

In certain embodiments, the polymer system described herein may be prepared in a one-pot synthesis, wherein one or more monomers are sequentially fed into a single reaction vessel to obtain a polymer system with the desired characteristics. In other embodiments, a polymer blend is prepared by mixing two or more polymers together to obtain a polymer system as described herein.

In an embodiment, the present invention includes a method to make a coating composition or paint composition. The method includes the steps of providing one or more latex polymers and adjusting the acid content and molecular weight of the one or more latex polymers to obtain a polymer system having at least about 10% to 30%, preferably 15% to 25% of the system includes polymers having molecular weight of about 10,000 to about 40,000, preferably 15,000 to 35,000, more preferably 20,000 to 30,000, and acid percent of about 2 to 20, preferably 5 to 10.

In an aspect, the polymer system may be made by combining a first polymer with a second polymer, such that the ratio of the first polymer to the second polymer is 0:100 to 100:0, preferably 10:90 to 90:10, more preferably 30:70 to 70:30, most preferably 50:50. In another aspect, the polymer system may be made by combining a first polymer comprising about 40 to 95 wt %, preferably 45 to 90 wt %, more preferably 50 to 85 wt %, of the total weight of the polymer system, with a second polymer comprising about 5 to 60 wt %, preferably 10 to 55 wt %, more preferably 15 to 50 wt % of the total weight of the polymer system. In yet another aspect, either the first or second polymer may be an alkali-soluble support polymer.

In a preferred embodiment, irrespective of the preparative or synthetic method used, the type and/or concentration of the monomer or polymer reactants are varied to produce a polymer system where a specific proportion of the system has a specific molecular weight and specific acid percent or theoretical acid number. In a preferred aspect, the polymer system described herein includes one or more latex polymers, wherein at least about 10% to 30%, preferably 15% to 25% of the system includes polymers having molecular weight of about 10,000 to about 40,000, preferably 15,000 to 35,000, more preferably 20,000 to 30,000, and acid percent of about 2 to 10, preferably 5 to 7. In a preferred aspect, the polymer system described herein includes one or more latex polymers, wherein at least about 10% to 30%, preferably 15% to 25% of the system includes polymers having molecular weight of about 10,000 to about 40,000, preferably 15,000 to 35,000, more preferably 20,000 to 30,000, and theoretical acid value of about 25 to 70, preferably 30 to 65.

In an embodiment, the coating composition or paints made with the polymer system described herein demonstrate excellent washability or stain resistance. Washability is measured by a standard test as described below, and washability ratings are assigned on a scale from 0 to 10, where a rating of 0 corresponds to very poor stain removal, and a rating of 10 corresponds to complete stain removal. In an aspect, the paints described herein show washability ratings over either 25 cycles or 100 cycles of testing of preferably at least 6, more preferably at least 7, and most preferably at least 8.

The composition described herein may include other components or additives, added to either the reaction mixture of monomers used to make the composition, to the polymer system, or to a paint composition that includes the polymer system described herein. Methods of making paints are known to those of skill in the art. Suitable additives used in paint compositions are known to those of skill in the art and include, for example, coalescent agents, pigments, surfactants, open time agents, pH adjustors, initiator and chaser solutions, cross-linking agents, preservatives, defoaming agents, anticorrosive agents, and combinations thereof.

In an aspect, the coating composition described herein may include a coalescing agent that aids in film formation. Preferred coalescing agents have VOC content of less than about 50%, preferably less than about 30%, more preferably, less than about 20%, and most preferably, less than about 15%. Exemplary suitable coalescing agents include low VOC compounds of the type described in detail at least in U.S. Pat. Nos. 6,762,230 and 7,812,079. Other suitable low VOC coalescents include Optifilm (Eastman Chemical, Kingsport Tenn.), Loxanol (Cognis, Kankakee Ill., now BASF), Archer RC (ADM, Decator Ill.), and the like. Conventional coalescing agents such as, Texanol (Eastman Chemical) and the like can also be used, either alone or in combination with other solvents such as, for example, 2-butoxyethanol (butyl cellosolve), diethylene glycol monobutyl ether (butyl carbitol), and the like, provided low VOC levels are maintained in the coating composition or paint.

In an aspect, the coating composition, when included in a paint, for example, may include one or more pigments, including pigments or fillers used to tone or opacify the paint. Suitable examples of pigments include, without limitation, titanium dioxide white, carbon black, lamp black, black iron oxide, red iron oxide, yellow iron oxide, brown iron oxide (a blend of yellow and red oxide with black oxide), phthalocyanine green, phthalocyanine blue, organic reds (such as naphthol red, quinacridone red and toluidine red), quinacridone magenta, quinacridone violent, DNA orange, and/or organic yellows (such as Hansa yellow), for example.

In an aspect, the coating composition described herein can be used in a paint that further includes one or more additives. Suitable additives include, without limitation, fillers, thixotropes, rheological modifiers, matting agents, and the like. The additives may include one or more ingredients added to a paint to modify the properties or enhance paint performance during storage, handling, application and other or subsequent stages. Desirable performance characteristics of a paint include, for example, chemical resistance, abrasion or scrub resistance, tack resistance, hardness, gloss, reflectivity, appearance and/or a combination of such properties and similar other properties. Preferred performance enhancing additives include lacquers, waxes, flatting agents, additives to prevent mar, abrasion and the like.

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

EXAMPLES

Unless indicated otherwise, the following test methods were utilized in the Example(s) that follow(s).

Stain Resistance or Washability

The stain resistance or washability of the paint is tested using ASTM D3450-00 (Standard Test Method for Washability Properties of Interior Architectural Coatings).

Example 1

To a 3-liter cylindrical flask was charged 1250 g deionized water and 2.0 g Rhodapon UB (Rhodia). The flask was fitted with an agitator and flask head, and then placed in a water bath heated to 80° C. A monomer emulsion was made by first adding 300 g deionized water and 8.0 g Rhodapon UB to a beaker and agitating. Each of the following was then added: 234 g butyl acrylate, 297 g methyl methacrylate, 60 g methacrylic acid, and 9.0 g dodecanethiol.

60 g of the monomer emulsion was added to the flask and allowed to equilibrate. When the flask reached 78° C., 1.8 g ammonium persulfate in 30 g deionized water was added to the flask and allowed to react for 15 minutes before starting feed of the remaining monomer emulsion into the flask over a 90 minute time period. The flask was held at 80° C. for 30 minutes following completion of the monomer feed, and was then allowed to cool. At 55° C., a mixture of 39 g ammonium hydroxide (26%) in 60 g deionized water was fed to the flask over a 20 minute time period. Lines were then rinsed with 85 g deionized water and allowed to cool to 35° C. before decanting. The resulting latex had a solids content (NVM) of 25.3% and a pH of 8.7.

Example 2

To a 3-liter cylindrical flask was charged 600 g deionized water and 1.0 g Rhodapon UB (Rhodia). The flask was fitted with an agitator and flask head, and then placed in a water bath heated to 80° C. A monomer emulsion was made by first adding 350 g deionized water and 50.0 g Rhodapon UB to a beaker and agitating. Each of the following was then added: 612 g butyl acrylate, 560 g methyl methacrylate, and 18 g methacrylic acid.

60 g of the monomer emulsion was added to the flask and allowed to equilibrate. When flask reached 78° C., 1.8 g ammonium persulfate in 30 g deionized water was added to the flask and allowed to react for 15 minutes before starting feed of the remaining monomer emulsion into the flask over a 3-hour time period. The flask was held at 80° C. for 30 minutes following completion of the monomer emulsion feed, and was then allowed to cool. At 40° C., 7 g of ammonium hydroxide (26%) was added to the flask, and lines were rinsed with 54 g deionized water. The flask was allowed to cool to 35° C. before decanting. The resulting latex had solids content (NVM) of 49.9% and a pH of 8.9.

Example 3

To a 3-liter cylindrical flask was charged 750 g deionized water and 1.6 g Rhodapon UB (Rhodia). The flask was fitted with an agitator and flask head and placed in a water bath heated to 80° C. A monomer emulsion was made by first adding 120 g deionized water and 2.6 g Rhodapon UB to a beaker and agitating. Each of the following was then added: 30 g butyl acrylate, 155 g methyl methacrylate, 20 g methacrylic acid, and 3.3 g dodecanethiol.

A second monomer emulsion was made by first adding 190 g deionized water and 40 g Rhodapon UB to a beaker and agitating. Each of the following was then added: 515 g butyl acrylate, 462 g methyl methacrylate, and 16 g methacrylic acid.

30 g of the first monomer emulsion was added to the flask and allowed to equilibrate. When the flask reached 78° C., 1.8 g ammonium persulfate in 30 g deionized water was added to the flask and allowed to react for 15 minutes before starting feed of the first monomer emulsion into the flask over a 30 minute time period. The flask was held at 80° C. for 10 minutes following completion of the monomer emulsion feed, and then a mixture of 14 g ammonium hydroxide in 55 g deionized water was added to the flask over a 10 minute time period. Next, 1.8 g ammonium persulfate in 20 g deionized water was added to the flask and a feed of the second monomer emulsion into the flask was started over a 2-hour time period. The flask was held at 80° C. for 30 minutes following the completion of the second monomer emulsion feed, and then allowed to cool to 40° C. 5.0 g ammonium hydroxide were added to the flask and lines were rinsed with 143 g deionized water and allowed to cool to 35° C. before decanting. The resulting latex had a solids content (NVM) of 45.5% and a pH of 7.6.

Example 4

Coating compositions #1 to #7 were prepared by blending 10% of a polymer made according to Example 1 and 90% of a polymer made according to Example 2. The acid content and molecular weight of the first polymer was adjusted as shown in Table 1. The coating compositions were included in paints made by conventional methods known to those of skill in the art. As demonstrated in Table 1, acid content and molecular weight contribute to stain resistance, and is further confirmed by statistical analysis (MW p value=0.036; acid content p value=0.105), whereas Tg does not have a statistical significant or predictable effect on the washability of the tested compositions.

TABLE 1

| | | | Washability | | | |
|---|---|---|---|---|---|---|
| | Mw | PDI | % Acid | Tg | Acid # (Theo) | Stain removal |
| 1 | 20,405 | 3.85 | 10 | 65° C. | 65.1 | 6.1 |
| 2 | 21,720 | 13.13 | 5 | 62° C. | 32.5 | 5.1 |
| 3 | 25,035 | 5.19 | 5 | 20° C. | 32.5 | 4.4 |
| 4 | 24,355 | 4.91 | 10 | 22° C. | 65.1 | 5.5 |
| 5 | 52,940 | 6.57 | 10 | 20° C. | 65.1 | 5.4 |
| 6 | 47,970 | 6.53 | 5 | 18° C. | 32.5 | 4 |
| 7 | 59,505 | 16.68 | 5 | 65° C. | 32.5 | 3.6 |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:
1. A coating composition, comprising:
   a polymer system comprising one or more latex polymers, wherein at least about 10% up to 30% by weight of the polymer system includes at least one polymer having a molecular weight of about 10,000 to about 40,000 and an acid percent of about 5 to 10, wherein the coating composition has a pigment volume concentration (PVC) of about 30 to 55.

2. The coating composition of claim 1, wherein the one or more latex polymers include one or more polymerization products of one or more ethylenically unsaturated monomers.

3. The coating composition of claim 1, wherein the one or more latex polymers include one or more polymerization products of one or more ethylenically unsaturated monomers selected from the group consisting of acrylic acid, $C_1$-$C_8$ esters of acrylic acid, substituted $C_1$-$C_8$ esters of acrylic acid, methacrylic acid, $C_1$-$C_8$ ester of methacrylic acid, substituted $C_1$-$C_8$ esters of methacrylic acid, styrene, a-methyl styrene, vinyl toluene, vinyl acetate, vinyl propionate, allyl methacrylate, and mixtures thereof.

4. The coating composition of claim 1, wherein the one or more latex polymers include one or more polymerization products of one or more acrylic monomers.

5. The coating composition of claim 1, wherein the one or more latex polymers comprise one or more alkali-soluble support polymers.

6. The coating composition of claim 1, wherein the polymer system comprises:
 a first latex polymer comprising about 50 to 85 wt % of the polymer system, based on the total weight of the system; and
 a second latex polymer comprising about 15 to 50 wt % of the polymer system, based on the total weight of the system.

7. The coating composition of claim 1, wherein the polymer system comprises a first latex polymer and a second latex polymer, wherein the ratio of the first latex polymer to the second latex polymer is from 10:90 to 90:10.

8. The coating composition of claim 1, wherein the at least one polymer being at least about 10% up to 30% by weight of the polymer system has a molecular weight of about 20,000 to 30,000.

9. The coating composition of claim 1, wherein the at least one polymer being at least about 10% up to 30% by weight of the polymer system has a molecular weight of about 15,000 to about 25,000.

10. The coating composition of claim 1, wherein the at least one polymer being at least about 10% up to 30% by weight of the polymer system has a theoretical acid value of about 25 to about 75.

11. The coating composition of claim 1, wherein the at least one polymer being at least about 10% up to 30% by weight of the polymer system has a theoretical acid value of about 30 to about 70.

12. The coating composition of claim 1, wherein the composition exhibits a washability rating of at least 8.

13. The coating composition of claim 1, wherein the polymer system comprises a polymerization product from styrene, butyl acrylate, 2-(acetoacetoxy)ethyl methacrylate, methyl methacrylate, and butyl methacrylate.

14. The coating composition of claim 1, wherein the polymer system comprises at least one copolymer derived from styrene, butyl acrylate, 2-(acetoacetoxy)ethyl methacrylate, methyl methacrylate, and butyl methacrylate.

15. The coating composition of claim 1, wherein the coating composition exhibits a washability rating of at least 6.

16. The coating composition of claim 1, wherein the coating composition exhibits a washability rating of at least 7.

17. The coating composition of claim 1, wherein at least about 15% up to 30% by weight of the polymer system includes the at least one polymer.

18. The coating composition of claim 1, wherein at least about 15% up to 25% by weight of the polymer system includes the at least one polymer.

19. The coating composition of claim 1, wherein the at least one polymer having the molecular weight of about 10,000 to about 40,000 and the acid percent of about 5 to 10 is methacrylic acid.

* * * * *